United States Patent
Dickers et al.

(10) Patent No.: US 6,185,935 B1
(45) Date of Patent: Feb. 13, 2001

(54) METHOD AND APPARATUS FOR CONTROLLING THE TEMPERATURE OF AN EXHAUST GAS TREATMENT SYSTEM

(75) Inventors: Guido Dickers, Moenchengladbach; Klemens Grieser, Langenfeld, both of (DE)

(73) Assignee: Ford Motor Company, Dearborn, MI (US)

( * ) Notice: Under 35 U.S.C. 154(b), the term of this patent shall be extended for 0 days.

(21) Appl. No.: 09/298,157

(22) Filed: Apr. 23, 1999

(30) Foreign Application Priority Data

Apr. 21, 1998 (DE) .............................. 198 17 650

(51) Int. Cl.$^7$ ........................................ F01N 3/10
(52) U.S. Cl. ................ 60/300; 60/286; 60/288; 60/298
(58) Field of Search .............. 60/286, 287, 288, 60/298, 300

(56) References Cited

U.S. PATENT DOCUMENTS

| | | | |
|---|---|---|---|
| 3,957,444 | * | 5/1976 | Goto et al. ................. 23/288 FA |
| 5,388,404 | * | 2/1995 | Tsumura ................... 60/284 |
| 5,855,113 | * | 1/1999 | Cullen et al. .............. 60/274 |

* cited by examiner

Primary Examiner—Teresa Walberg
Assistant Examiner—Shawntina Fuqua
(74) Attorney, Agent, or Firm—Allan J. Lippa

(57) ABSTRACT

A method for controlling the temperature of an exhaust gas treatment system in the exhaust system of an internal combustion engine in the region of a predetermined intended temperature, comprising a two-position device for varying the temperature of the exhaust gases, a device for measuring the actual temperature and a device for determining a quantity which approximately represents a value for the input of energy into the exhaust gas treatment system is described, as is an apparatus for putting the method into practice. The actual temperature is compared with the intended temperature in a two-step control element and an output signal is produced. From this output signal a modified output signal is produced and supplied to the varying device, such that in case of an output signal which indicates heating of the exhaust gas, if the energy input value is increasing this signal is modified in a direction effecting cooling of the exhaust gas, and/or that in the case of an output signal which indicates cooling of the exhaust gas, if the energy input value is decreasing this signal is modified in a direction effecting heating of the exhaust gas. Further, the two-step control can be formed so as to have accelerated response. By these measures a stable temperature control is obtained despite large time lags.

10 Claims, 3 Drawing Sheets

METHOD AND APPARATUS FOR CONTROLLING THE TEMPERATURE OF AN EXHAUST GAS TREATMENT SYSTEM

FIELD OF THE INVENTION

The invention relates to a method for controlling the temperature of an exhaust gas treatment system in the exhaust system of an internal combustion engine in the region of a predetermined intended temperature, comprising a device for varying the temperature of the exhaust gases flowing through the exhaust gas treatment system, by means of which the exhaust gas treatment system is supplied with colder or hotter exhaust gases in dependence on a control signal of an engine control unit, and also comprising a device for determining the actual temperature of the exhaust gas treatment system and a device for determination of a quantity which approximately represents a value for the input of energy into the exhaust gas treatment system, and to an apparatus for putting the method into practice.

BACKGROUND AND PRIOR ART

This kind of temperature control is necessary in particular in the case of nitrogen oxide traps ($NO_x$ traps) such as are employed for exhaust gas purification in engines operating with a weak mixture (lean burn engines). While conventional three-way catalytic converters produce satisfactory conversion results over a relatively wide range of temperatures, and in the last few years it has been possible to reduce their sensitivity to overheating, known nitrogen oxide traps only operate in a satisfactory manner in a relatively restricted range of temperatures. At lower temperatures the nitrogen oxide trap does not absorb the pollutants efficiently enough. At too high temperatures the absorbed pollutants are partly set free again, thus impairing the purification efficiency. At still higher temperatures the nitrogen oxide trap can suffer accelerated ageing or even be permanently damaged. In view of the fact that under different engine conditions exhaust gas temperatures can vary in a range from 200 to 1000° C., control of the exhaust gases flowing through the exhaust gas treatment system is necessary.

In German patent application 197 03 295.8, which was not published at the date of the present application, a method for controlling the temperature of a catalytic converter having a nitrogen trap is proposed in which the temperature of the nitrogen oxide trap is measured and the nitrogen oxide trap is operated in the weak mixture mode in a temperature range corresponding to the optimum efficiency of the nitrogen oxide trap by a device for varying the temperature of the exhaust gas. The device for varying the exhaust gas temperature can be an exhaust gas line having two pathways for the gas which have different heat losses from the exhaust gas and can be selected by means of a valve controlled by an actuating element. To perform the control it is proposed to employ a PI control element.

It has been found that the temperature sensor in the exhaust gas path should be located not before but preferably after at least one element of the nitrogen oxide trap. This arrangement has the particular advantage that if something goes wrong a threat of overheating can be investigated and prevented. Thus if ambient air penetrates into the exhaust system through a leak in the exhaust gas path before the nitrogen oxide trap, then in the case of engine operation with an enriched mixture (e.g. at full load) exothermal reactions occur with unburned components of the fuel, which can lead to overheating of the substrate in the nitrogen oxide trap. If the temperature sensor is located before the nitrogen oxide trap, the risk of such overheating cannot be detected.

However, locating the sensor after at least one element of the nitrogen oxide trap (e.g. between two elements [so-called "bricks"]), has the disadvantage that owing to the thermal inertia of these elements the control exhibits very long time lags. Thus a change in the exhaust gas temperature only leads to a corresponding change in the actual temperature measured at the temperature sensor after a delay of some 10 seconds. Such systems can only be controlled with difficulty by conventional PI controls, since unacceptable control oscillations occur. To handle such systems with long time lags so-called time lag controls have been proposed. However, in the case of time lag controls it is necessary to have a mathematical model of the system to be controlled and an advance estimate of the lag. Under unusual operating conditions, or if a fault develops, these models can fail, so that uncontrollable control response can occur.

OBJECT OF THE INVENTION

The object of the invention is to provide a process of the kind referred to above in which, by simple means, stable temperature control can be obtained under all operating conditions irrespective of the long time lags.

SUMMARY OF THE INVENTION

To achieve this object it is proposed that the actual temperature is compared with the intended temperature in a two-step control element which produces an output signal indicating cooling or heating of the exhaust gas, and that from this output signal a modified output signal is produced and supplied to the varying device, such that in case of an output signal which indicates heating of the exhaust gas, if the energy input value is increasing the signal is modified in a direction effecting cooling of the exhaust gas and/or that in the case of an output signal which indicates cooling of the exhaust gas, if the energy input value is decreasing this signal is modified in a direction effecting heating of the exhaust gas. As a result of the output signal from the two-step control element member being modified on the basis of the energy input value, there is a limitation of the control output, thus avoiding overshooting of the temperature of the exhaust gas treatment system. Preferably a control output limitation is provided both in the case of an output signal indicating exhaust gas heating and of one indicating exhaust gas cooling. However, a control output limitation may also be provided in only one of these two cases.

In an advantageous embodiment of the invention, it can be provided that the modification takes place by modulation of the output signal by means of a squarewave signal the duty factor of which, in the case of an output signal indicating heating of the exhaust gas, is varied (starting from a duty factor indicating a steady heating) in the direction of an increasing cooling of the exhaust gas when a predetermined engine operating condition is exceeded and the energy input value is increasing, and/or the duty factor of which, in the case of an output signal indicating cooling of the exhaust gas, is varied (starting from a pulse control factor indicating a steady cooling) in the direction of increased heating of the exhaust gas if a predetermined engine operating condition is fallen below and the energy input value is decreasing. The square-wave signal preferably has a period (e.g. 10 seconds) such that the control actuator can simply follow it mechanically. The oscillations of the exhaust gas temperature caused by the modulation are eliminated by the thermal inertia of the exhaust gas treatment system.

It can further be provided that the determination of the energy input value takes place at least using the mass air flow in the intake system of the internal combustion engine, which approximately represents the current mass flow of exhaust gas. The mass flow of exhaust gas is an approximate measure of the heat energy supplied to the converter per unit of time. The greater this energy input, the more quickly does the material of the nitrogen oxide trap adapt to the exhaust gas temperature and the more severely must the control output limitation be curtailed. However, further engine operating parameters can also be taken into account in the limitation of the control output: for example, the vehicle speed, which has a considerable effect on the heat losses through the airflow at the nitrogen oxide trap.

It may further advantageously be provided that the duty factor is determined using a functional relationship, in dependence on the energy input value and the output signal of the two-step control element, and using the intended temperature value. The functional relationship can be a table memory (characteristic map) or an analytical function having the said index values or parameters. The intended temperature value is usually fixed in advance during the normal engine operation. However, the intended temperature of the nitrogen oxide trap may be increased, particularly during the desulphurising cycle in a nitrogen oxide trap. Since the falls in temperature due to flow and radiation are not linearly related to the temperature of the nitrogen oxide trap, different duty factor characteristic fields are provided for different intended temperatures.

The response of the method of control in accordance with the invention can be further substantially improved by providing the two-step control element with accelerated response.

The accelerated response can preferably be provided by time differentiation of the actual temperature signal and weighted addition of the derived signal to the actual temperature signal and supplying the summed signal to the comparator of the two-step control element. The rate of change of the actual temperature signal is thereby included in the control, so that overshooting can already be countered early on.

The weighting factor of the derived signal can preferably be determined in dependence on the output signal of the two-step control element and in dependence on a value representing the energy input into the exhaust gas treatment system. Thus at a larger energy input the control can react more sensitively to changes in the actual temperature.

In an apparatus for putting the method into practice the varying device comprises an exhaust gas valve having two positions, wherein the exhaust gas is led via two exhaust paths having different heat losses, and the device for determining the actual temperature is provided with a temperature sensor which is located in the exhaust gas path after at least one element of the exhaust gas treatment system. With this arrangement the temperature of the exhaust gas treatment system is also reliably detected and taken into account in the control even in the case of faults in which an exothermic reaction can take place in the exhaust gas treatment system.

An advantage of the method in accordance with the invention is that the control can be performed on the basis of a simple and robust two-step control element. In particular, no temperature models of the exhaust gas treatment system or assumptions about the time lag of the control loop are required. Despite the presence of long time lags, a good control response is obtained.

A further advantage of the method in accordance with the invention is that a binary control signal is produced. Hence a relatively inexpensive two-position actuator can be used which works without a position check-back sensor.

BRIEF DESCRIPTION OF THE DRAWINGS

The invention will now be described in more detail with reference to the accompanying drawings, in which.

DETAILED DESCRIPTION OF PREFERRED EMBODIMENTS

Figure 1:
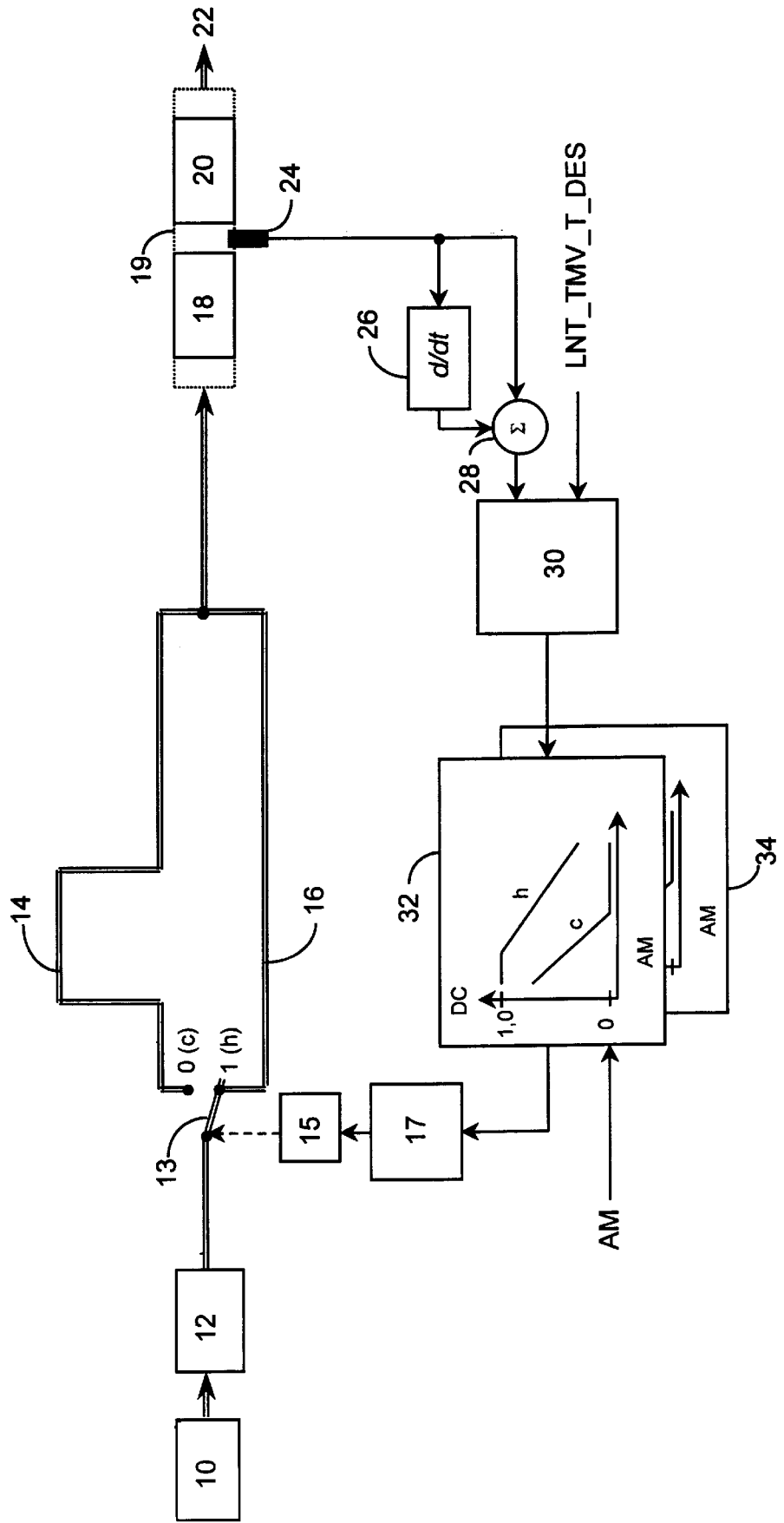
FIG. 1 shows diagrammatically an exhaust system of an internal combustion engine and a schematic block diagram of the method in accordance with the invention.

As shown in FIG. 1, an internal combustion engine denoted by 10 produces exhaust gases which are passed along an exhaust pipe to a three-way catalytic converter indicated by 12. The three-way converter 12 is located close to the engine 10 (so-called light-off converter) so as to ensure rapid heating up after the engine 10 is started. In the exhaust gas path an exhaust valve 13 is provided, likewise in the spatial vicinity of the engine 10, by means of which the exhaust gases can be selectively routed along two different exhaust gas paths 14, 16 having different exhaust gas heat losses. The exhaust gas path 14 includes a cooling loop having greater exhaust gas heat losses than in the case of the exhaust gas path 16, which is made as short as possible. The exhaust gas valve 13 is actuated by a two-position actuator 15, e.g. a solenoid actuator. The exhaust gas valve is shown diagrammatically in FIG. 1 as a change-over valve between the exhaust gas paths 14, 16. However, it can also be provided that the exhaust gas paths 14, 16 are formed so as to have markedly different flow resistance, with the valve 13 merely opening or closing the exhaust gas path with the lower resistance to flow. In the case in which the valve 13 is open, the exhaust gas flows predominantly through the exhaust gas path having the lower flow resistance. When the valve 13 is closed, on the other hand, it flows through the exhaust path with the higher flow resistance. Some distance away from the internal combustion engine 10 a nitrogen oxide trap assembly 19 is located in the exhaust path, in which two carriers 18, 20 with a catalyst substrate are located in a common housing. A temperature sensor 24 is provided between the carriers 18, 20. The purified exhaust gases are led off through an exhaust system 22.

The valve actuator 15 and the measured temperature value from the sensor 24 are in communication with a control device which forms part of an electronic engine control unit. The engine control unit is based on a microprocessor and includes the usual peripherals (ROM, RAM, non-volatile memory, clock and input/output ports) by means of which the engine control unit receives a plurality of measured engine values and passes a plurality of control signals e.g. to the ignition and fuel injection units. The measured value from the temperature sensor 24 is supplied to a two-step control element 30, which obtains the predetermined intended temperature LNT_TMV_T_DES as intended value. In addition the signal from the sensor 24 is differentiated at 26 and is added at 28 to the value supplied to the control element 30. The two-step control 30 delivers a binary output signal "heat" (h) or "cool" (c). This output signal is subjected to a control output limitation and is then supplied to the actuator 15. In the control output limitation the binary output signal of the two-step control 30 is modulated with a square-wave signal. The duty factor is stored in table memories 32, 34. In dependence on the output signal, in each case two different characteristic maps h (heat) and c (cool) are provided, which contain the duty factor to be modulated in dependence on the current exhaust gas mass flow. The exhaust gas mass flow approximately corresponds to the air mass flow AM which is determined by the engine control unit through an air mass flow sensor (not shown). For different intended temperature values LNT_TMV_T_DES different characteristic maps 32, 34 are provided in each case. The duty factors established are converted by a square wave generator 17 into control patterns for the actuator 15. As shown schematically at 32, when there is a "heat" output signal, at low exhaust gas mass flows the valve 13 is held constantly in position "1" (heat). At higher exhaust gas mass flows the heating power is progressively reduced. When there is a "cool" output signal, at low exhaust gas mass flows cooling is only performed with reduced power. At higher exhaust gas mass flows the intensity of cooling increases until from a specified exhaust gas mass flow it reaches its maximum value. The characteristic maps 32, 34 are preferably determined empirically on the engine test bed.

Figure 2:
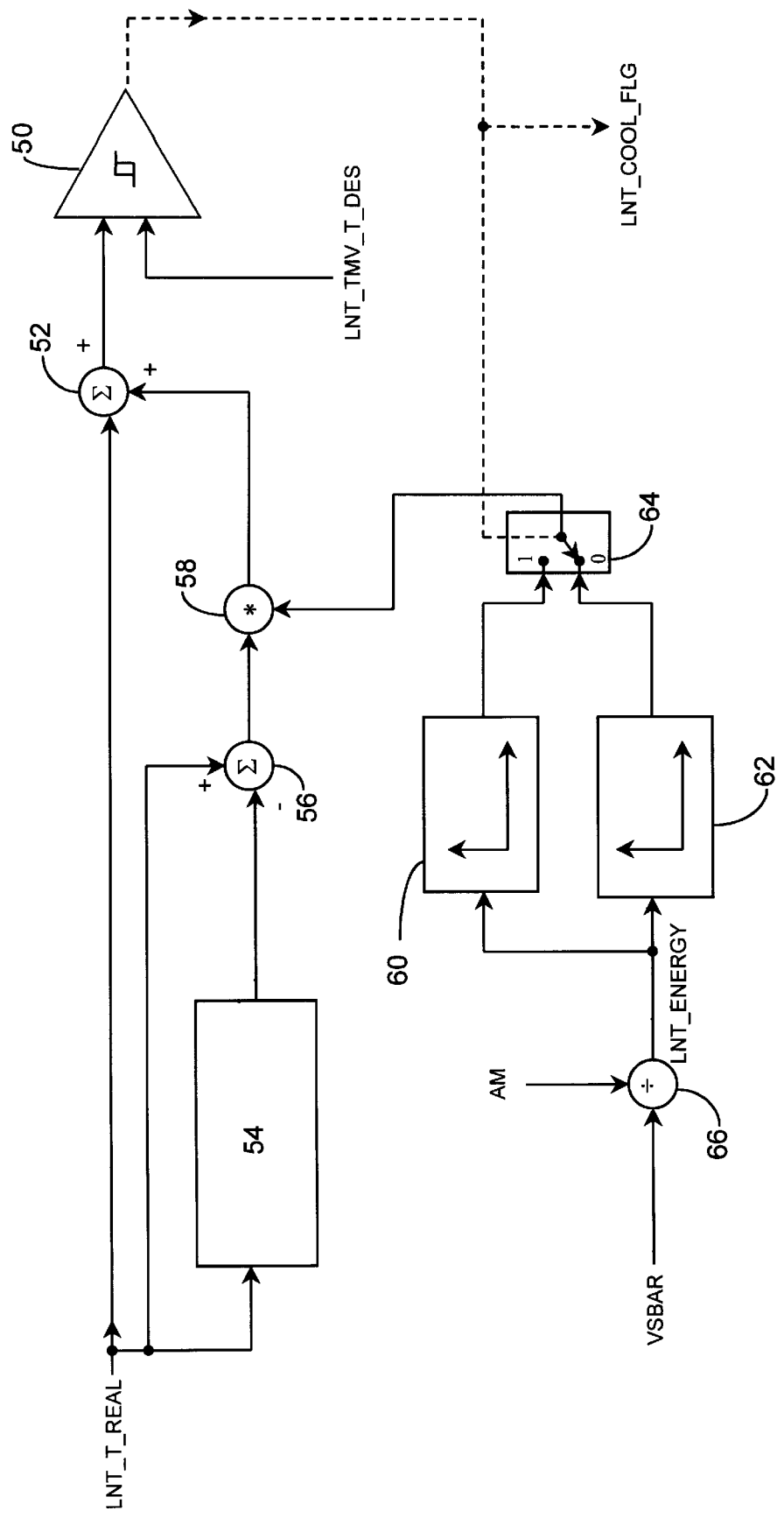
FIG. 2 is a more detailed block diagram of the two-step control algorithm in accordance with the invention.

In FIG. 2 the construction of the two-step control member is shown in more detail. The digitised measured value from the temperature sensor LNT_T_REAL is compared with the prescribed intended temperature value LNT_TMV_T_DES in a comparator 50 which is subject to hysteresis. The intended temperature value LNT_TMV_T_DES is predetermined by a higher level control unit and can be varied, for example for performance of a desulphurising cycle. The comparator delivers a binary output signal LNT_COOL_FLG. To the actual temperature value a differentiated temperature signal is added before the comparator at 52. This is obtained by a low-pass filter at 54 and subtraction at 56. The signal obtained in this way is multiplied at 58 by a weighting factor. The weighting factor is derived from characteristic maps 60 or 62 as the case may be in dependence on the output signal LNT_T_COOL_FLG (selection by switch 64). The characteristic maps contain the weighting factor as a function of a quantity LNT_ENERGY, which approximately represents the energy input into the nitrogen oxide trap. This is determined at 66 by dividing the air mass flow AM by the vehicle speed VSBAR (the greater the mass flow of exhaust gas, the more heat energy will be supplied to the nitrogen oxide trap, while on the other hand the greater the vehicle speed, the greater is the cooling by the airflow). The weighting factor tends to be increased in case of greater energy input, so that the control unit reacts more quickly to trends in actual temperatures.

Figure 3:
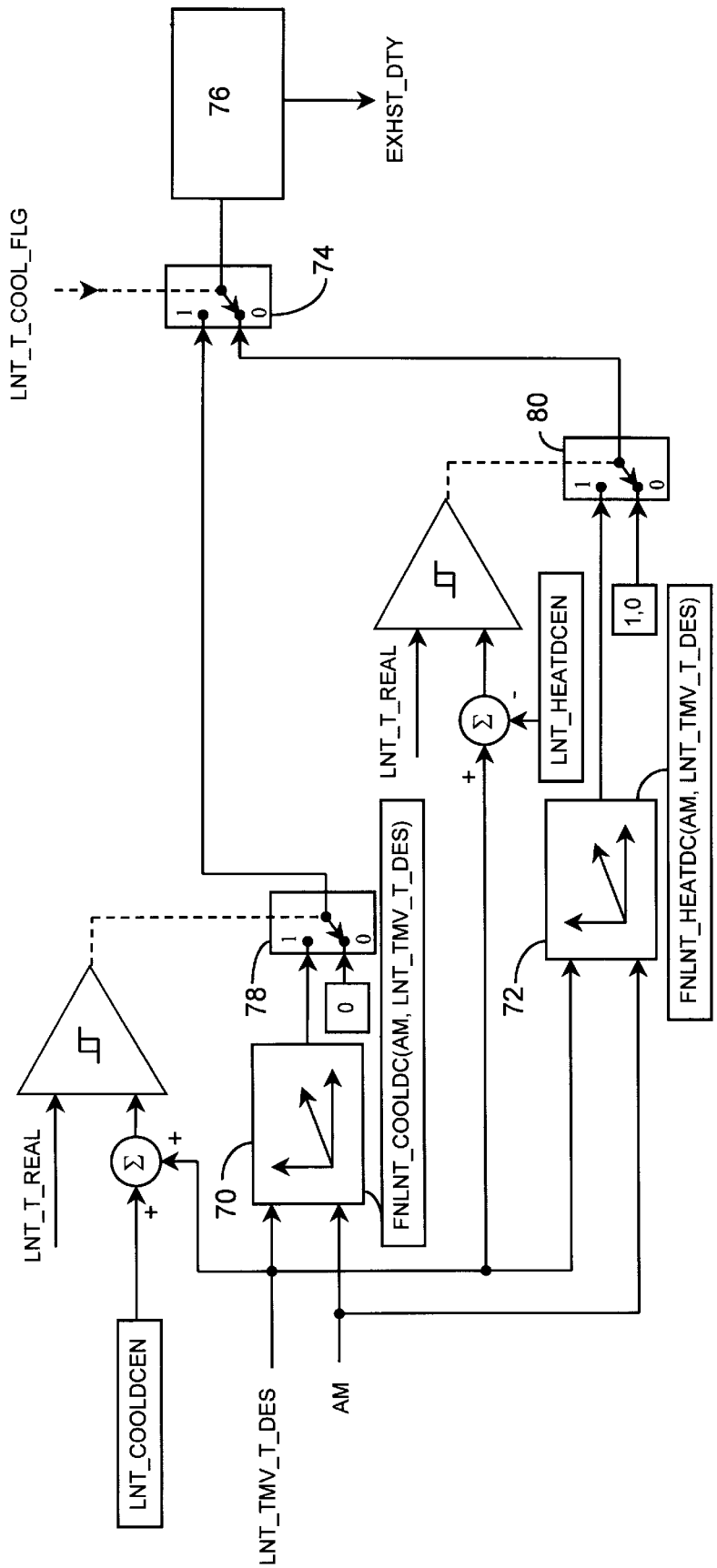
FIG. 3 is a more detailed block diagram of the control output limitation algorithm.

In FIG. 3 the mode of operation of the control output limitation is shown in more detail. At the core are two characteristic maps FNLNT_COOLDC 70 or FNLNT_HEATDC 72 which represent the duty factor as a function of the exhaust gas mass flow represented by AM and contain the desired intended temperature LNT_TMV_T_DES. Alternatively, other values characterising the energy input into the nitrogen oxide trap, e.g. the quantity LNT_ENERGY from FIG. 2, could be used as parameters for the characterising maps 70 and 72. The output signal from the characterising map 70, 72 is supplied through the switch 74, dependent on the flag LNT_T_COOL_FLG, determined according to FIG. 2. to a square wave generator 76 which produces the signal for the control of the exhaust gas valve EXHST_DTY. In addition, the control output limitation may be deactivated by switches 78, 80. If according to LNT_T_COOL_FLG cooling is provided, this takes place if the actual temperature exceeds a predetermined value LNT_TMV_T_DES plus the constant LNT_COOLDCEN. Conversely, in the case of heating, the control value limitation is deactivated if the actual temperature falls below the intended temperature less the constant LNT_HEATDCEN.

What is claimed is:

1. A method for controlling the temperature of an exhaust gas treatment system in the exhaust system of an internal combustion engine in the region of a predetermined intended temperature, comprising a device for varying the temperature of the exhaust gases flowing through the exhaust gas treatment system, by means of which the exhaust gas treatment system is supplied with colder or hotter exhaust gases in dependence on a control signal of an engine control unit, and also comprising a device for determining the actual temperature of the exhaust gas treatment system and a device for determination of a quantity which approximately represents a value for the input of energy into the exhaust gas treatment system, characterized in that the actual temperature is compared with the intended temperature in a two-step control element (30) which produces an output signal indicating cooling or heating of the exhaust gas, and that from this output signal a modified output signal is produced and supplied to the varying device, such that in case of an output signal which indicates heating of the exhaust gas, if the energy input value is increasing the signal is modified in a direction effecting cooling of the exhaust gas and/or that in the case of an output signal which indicates cooling of the exhaust gas, if the energy input value is decreasing this signal is modified in a direction effecting heating of the exhaust gas.

2. A method as claimed in claim 1, wherein the modification takes place by modulation of the output signal by means of a square-wave signal the duty factor of which, in the case of an output signal indicating heating of the exhaust gas, is varied (starting from a duty factor indicating a steady heating) in the direction of an increasing cooling of the exhaust gas when a predetermined engine operating condition is exceeded and the energy input value is increasing, and/or the duty factor of which, in the case of an output signal indicating cooling of the exhaust gas, is varied (starting from a duty factor indicating a steady cooling) in the direction of increased heating of the exhaust gas if a predetermined engine operating condition is fallen below and the energy input value is decreasing.

3. A method as claimed in claim 2, wherein the determination of the energy input value takes place at least using the mass air flow (AM) in the intake system of the internal combustion engine, which approximately represents the current mass flow of exhaust gas.

4. A method as claimed in claim 3, wherein the duty factor is determined using a functional relationship, in dependence on the energy input value and the output signal of the two-step control element (39), and using the intended temperature value.

5. A method as claimed in claim 4, wherein the two-step control element has accelerated response.

6. A method as claimed in claim 5, wherein the accelerated response is implemented by time differentiation of the actual temperature signal and weighted addition of the derived signal to the actual temperature signal and supplying the summed signal to the comparator of the two-step control element.

7. A method as claimed in claim 6, wherein the weighting factor of the derived signal is determined in dependence on the output signal of the two-step control element and in dependence on a value representing the energy input into the exhaust gas treatment system.

8. An apparatus for putting into practice the method claimed in claim 7, characterized in that the varying device comprises an exhaust gas valve (13) having two positions, wherein the exhaust gas is led via two exhaust paths (14, 16) having different heat losses, and the device for determining the actual temperature is provided with a temperature sensor (24) which is located in the exhaust gas path after at least one element (18) of the exhaust gas treatment system (19).

9. A system for controlling a temperature of an exhaust gas treatment system of an internal combustion engine, the system comprising:

a temperature sensor;

a valve assembly; and a controller for estimating an energy input into the exhaust gas treatment system based on an engine operating condition, determining the exhaust gas temperature based on said temperature sensor output, generating a cooling or heating signal based on said estimated energy input and said determined exhaust gas temperature, and controlling said valve assembly to adjust the exhaust gas temperature based on said cooling or heating signals.

10. A method for controlling an exhaust gas temperature of an internal combustion engine having an exhaust gas treatment system, the system coupled to a temperature sensor, the method comprising:

reading the temperature sensor to determine the exhaust gas temperature;

estimating en energy input into the exhaust gas treatment system based on an engine operating condition; and adjusting the exhaust gas temperature based on said exhaust gas temperature reading and said energy input estimate.

* * * * *